US011947061B2

(12) United States Patent
Ko et al.

(10) Patent No.: US 11,947,061 B2
(45) Date of Patent: Apr. 2, 2024

(54) EARTHQUAKE EVENT CLASSIFICATION METHOD USING ATTENTION-BASED CONVOLUTIONAL NEURAL NETWORK, RECORDING MEDIUM AND DEVICE FOR PERFORMING THE METHOD

(71) Applicant: Korea University Research and Business Foundation, Seoul (KR)

(72) Inventors: Hanseok Ko, Seoul (KR); Bon Hwa Ku, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 608 days.

(21) Appl. No.: 16/992,246

(22) Filed: Aug. 13, 2020

(65) Prior Publication Data

US 2021/0117737 A1    Apr. 22, 2021

(30) Foreign Application Priority Data

Oct. 18, 2019   (KR) .................. 10-2019-0143736
Nov. 11, 2019   (KR) .................. 10-2019-0129734

(51) Int. Cl.
  *G06F 18/24*    (2023.01)
  *G01V 1/00*     (2006.01)
  (Continued)

(52) U.S. Cl.
  CPC .............. *G01V 1/008* (2013.01); *G06F 18/21* (2023.01); *G06F 18/24* (2023.01); *G06V 10/82* (2022.01)

(58) Field of Classification Search
  CPC .... G06F 18/214; G06F 18/24; G06F 2218/12; G06F 18/241; G06F 18/24147;
  (Continued)

(56) References Cited

U.S. PATENT DOCUMENTS

2022/0187486 A1*  6/2022  Ko ........................... G06N 3/08
2023/0078158 A1*  3/2023  Wang ..................... G06N 3/045
                                                                   702/14

FOREIGN PATENT DOCUMENTS

CN    110210296 A  *  9/2019  ............. G01V 1/282
KR    10-1919098 B1    11/2018
       (Continued)

OTHER PUBLICATIONS

Ku, Bon-Hwa et al., "Deep Convolutional Neural Network with Bottleneck Structure using Raw Seismic Waveform for Earthquake Classification", Journal of the Korea Society of Computer and Information, vol. 24, No. 1, Jan. 2019 (pp. 33-39).

(Continued)

*Primary Examiner* — Ian L Lemieux
(74) *Attorney, Agent, or Firm* — NSIP Law (57) ABSTRACT

An earthquake event classification method using an attention-based neural network includes: preprocessing input earthquake data by centering; extracting a feature map by nonlinearly converting the preprocessed earthquake data through a plurality of convolution layers having three or more layers; measuring importance of a learned feature of the nonlinear-converted earthquake data based on an attention technique in which interdependence of channels of the feature map is modeled; correcting a feature value of the measured importance value through element-wise multiply with the learned feature map; performing down-sampling through max-pooling based on the feature value; and classifying an earthquake event by regularizing the down-sampled feature value. Accordingly, main core features inherent in many/complex data are extracted through attention-based deep learning to overcome the limitations of the existing micro earthquake detection technology, thereby (Continued)

enabling earthquake detection even in low SNR environments.

15 Claims, 6 Drawing Sheets

(51) Int. Cl.
*G06F 18/21* (2023.01)
*G06V 10/82* (2022.01)

(58) Field of Classification Search
CPC ............ G06F 2218/00; G06F 18/2411; G06F 2218/08; G06N 3/08; G06N 20/00; G06N 3/04; G06N 3/045; G06N 3/02; G06N 3/042; G06N 3/084; G01V 1/30; G01V 1/008; G01V 1/307; G01V 1/28; G01V 1/288; G01V 1/284; G01V 1/003; G01V 2210/30; G01V 2210/50; G01V 2210/675; G01V 99/00
See application file for complete search history.

(56) References Cited

FOREIGN PATENT DOCUMENTS

| KR | 10-1914657 B1 | 1/2019 | |
| WO | WO-2021027026 A1 * | 2/2021 | ............... G01V 1/28 |

OTHER PUBLICATIONS

Lin, Zhao et al., "Squeeze and Excitation Rank Faster R-CNN for Ship Detection in SAR Images", *IEEE Geoscience and Remote Sensing Letters*, vol. 16, No. 5, May 2019 (pp. 751-755).

Korean Office Action dated Apr. 6, 2021 in counterpart Korean Patent Application No. 10-2019-0143736 (7 pages in Korean).

* cited by examiner

EARTHQUAKE EVENT CLASSIFICATION METHOD USING ATTENTION-BASED CONVOLUTIONAL NEURAL NETWORK, RECORDING MEDIUM AND DEVICE FOR PERFORMING THE METHOD

CROSS-REFERENCE TO RELATED APPLICATION

This application claims the benefit under 35 USC 119(a) of Korean Patent Application Nos. 10-2019-0143736 filed on Oct. 18, 2019 and 10-2019-0129734 filed on Nov. 11, 2019 in the Korean Intellectual Property Office, the entire disclosure of which is incorporated herein by reference for all purposes.

TECHNICAL FIELD

This disclosure relates to an earthquake event classification method using an attention-based neural network, and a recording medium and a device for performing the method, and more particularly, to a technique for extracting important feature information inherent in data through attention-based deep learning and accurately classifying even events such as various micro earthquakes and artificial earthquakes through the feature information.

BACKGROUND ART

Recently, natural disasters, such as extreme weather, are increasing due to climate change such as global warming. In Korea, the risk of earthquakes is gradually increasing, such as an earthquake of magnitude 5.4 in Pohang in 2017 following Gyeongju in 2016.

In order to prepare for the gradually increasing risk of earthquakes, various studies have been conducted to detect or predict earthquake occurrences in advance. In particular, in order to classify earthquake events, various earthquake events (micro earthquakes, artificial earthquakes) as well as strong earthquakes should be classified.

The STA/LTA method is a representative method for detecting earthquakes through a ratio threshold between short time average (STA) and long time average (LTA) and is not suitable in low SNR environments. This method determines whether earthquakes are detected based on STA/LTA results from multiple observation posts.

The autocorrelation-based method detects earthquakes based on correlation between earthquake waveforms repeated in a single region and has excellent performance, but this method has limitations in terms of computational overload and long-time signals.

The template matching method is a technique proposed to improve the problem of computation overload of the autocorrelation method, and this method sets an earthquake template and then detects earthquake through correlation between the template and an input earthquake waveform.

The number of templates has a major effect on performance, and there have been proposed approaches to reduce the number of templates through PCA (Principle Component Analysis) or subspace learning.

Recently, a FAST (Fingerprint And Similarity Thresholding) method has been proposed to improve the amount of computation of the template matching. This method is an unsupervised earthquake detection method that extracts fingerprint-like earthquake features through spectral images and Haar wavelet transformation and reduces similarity measurement computation through local sensitive hashing.

However, the conventional technologies do not satisfactorily classify small-scale micro earthquake from noise due to the low SNR environment, rather than a large-scale earthquake, and artificial earthquakes such as artificial blasting and nuclear testing become big obstacles in detecting natural micro earthquakes.

RELATED LITERATURES

Patent Literature (Patent Literature 1) KR 10-1914657 B1
(Patent Literature 2) KR 10-1919098 B1

DISCLOSURE

Technical Problem

Accordingly, the present disclosure is designed to overcome the above problems, and the present disclosure is directed to providing an earthquake event classification method using an attention-based neural network, which may build a robust earthquake detection system in a situation where noise, artificial earthquakes, and the like are mixed.

The present disclosure is also directed to providing a recording medium in which a computer program for executing the earthquake event classification method using an attention-based neural network is recorded.

The present disclosure is also directed to providing a device for performing the earthquake event classification method using an attention-based neural network.

Technical Solution

In one general aspect, there is provided an earthquake event classification method using an attention-based neural network, comprising: preprocessing input earthquake data by centering; extracting a feature map by nonlinearly converting the preprocessed earthquake data through a plurality of convolution layers having three or more layers; measuring importance of a learned feature of the nonlinear-converted earthquake data based on an attention technique in which interdependence of channels of the feature map is modeled; correcting a feature value of the measured importance value through element-wise multiply with the learned feature map; performing down-sampling through max-pooling based on the feature value; and classifying an earthquake event by regularizing the down-sampled feature value.

In an embodiment of the present disclosure, said measuring of importance of a learned feature may include performing a squeeze operation to compress the feature map while maintaining global information at each channel.

In an embodiment of the present disclosure, said performing of a squeeze operation may use a global weight average pooling method that diffuse a histogram with a low contrast image distribution based on contrast stretching.

In an embodiment of the present disclosure, said measuring of importance of a learned feature may further include performing an excitation operation to adaptively recalibrate the importance value according to the importance of each channel by using two fully-connected (FC) layers and a sigmoid activation function.

In an embodiment of the present disclosure, said performing of an excitation operation may include: passing the compressed feature map through a dimension reduction layer having a predetermined reduction ratio; and restoring the data passing through the dimension reduction layer to a channel dimension of the feature map.

In an embodiment of the present disclosure, said performing of a nonlinear mapping by passing input data of the preprocessed earthquake data through a plurality of convolution layers having three or more layers may further include batch-normalizing the feature value of the preprocessed earthquake data in a first convolution layer and a last convolution layer among the plurality of convolution layers.

In an embodiment of the present disclosure, said batch-normalizing of the feature value may obtain an average and dispersion of each feature value and then convert the regularized feature values while adding a scale factor and a shift factor thereto.

In an embodiment of the present disclosure, said classifying of an earthquake event by regularizing the down-sampled feature value may pass through first and second fully-connected (FC) layers, and the first fully-connected layer may perform a drop-out regularization process in which each neuron is activated according to a probability value and applied to learning.

In another aspect of the present disclosure, there is also provided a computer-readable recording medium, in which a computer program for executing the earthquake event classification method using an attention-based neural network is recorded.

In another aspect of the present disclosure, there is also provided an earthquake event classification device using an attention-based neural network, comprising: a preprocessing unit configured to preprocess input earthquake data by centering; a feature extracting unit including a plurality of convolution layers having three or more layers configured to extract a feature map by nonlinearly converting the preprocessed earthquake data, measure importance of a learned feature of the nonlinear-converted earthquake data based on an attention technique in which interdependence of channels of the feature map is modeled, correct a feature value of the measured importance value through element-wise multiply with the learned feature map, and perform down-sampling through max-pooling based on the feature value; and a classifying unit including first and second fully-connected (FC) layers configured to classify an earthquake event by regularizing the down-sampled feature value.

In an embodiment of the present disclosure, each convolution layer of the feature extracting unit may include: a nonlinear converting module configured to nonlinearly convert the preprocessed earthquake data; an attention module configured to output a feature value of the nonlinear-converted earthquake data by measuring importance of the learned feature based on the attention technique in which interdependence of channels of the feature map is modeled; and a max-pooling module configured to perform down-sampling through max-pooling based on the feature value.

In an embodiment of the present disclosure, a first convolution layer and a last convolution layer of the feature extracting unit may further include a batch normalization module configured to obtain an average and dispersion of each feature value and then convert the regularized feature values while adding a scale factor and a shift factor thereto.

In an embodiment of the present disclosure, the attention module may include: a squeeze operation unit configured to compress the feature map of the nonlinear-converted earthquake data while maintaining global information at each channel; an excitation operation unit configured to adaptively recalibrate the importance value according to the importance of each channel by using two fully-connected (FC) layers and a sigmoid activation function; and a scaling unit configured to correct the feature value of the measured importance value through element-wise multiply with the learned feature map.

In an embodiment of the present disclosure, the excitation operation unit may include: a dimension reduction unit configured to pass the compressed feature map through a dimension reduction layer having a predetermined reduction ratio; and a dimension restoration unit configured to restore the data passing through the dimension reduction layer to a channel dimension of the feature map.

In an embodiment of the present disclosure, a first fully-connected layer of the classifying unit may be configured to perform a drop-out regularization process in which each neuron is activated according to a probability value and applied to learning.

Advantageous Effects

According to the earthquake event classification method using an attention-based neural network, main core features inherent in many/complex data are extracted through attention-based deep learning to overcome the limitations of the existing micro earthquake detection technology, thereby enabling earthquake detection even in low SNR environments.

In addition, by providing accurate and rapid earthquake information, it is possible to reduce anxiety about earthquakes and improve the reliability of alarms. Based on the earthquake detection analysis information, it is possible to reduce the possibility of a large-scale disaster by inducing the construction of a major industrial facility to be built in a safe place or by preparing for a seismic design.

Further, it is possible to derive a region of interest by analyzing accumulated micro earthquake detection information, and it is possible to quickly warn and respond to earthquake damage by intensively monitoring the nearby regions.

BEST MODE

The present disclosure will be described in detail with reference to the accompanying drawings which illustrate, by way of example, specific embodiments in which the present disclosure may be implemented. These embodiments are described in sufficient detail to enable those skilled in the art to implement the present disclosure. It should be understood that various embodiments of the present disclosure are different from each other but need not be mutually exclusive. For example, specific features, structures and characteristics described herein may be implemented in other embodiments without departing from the scope of the present disclosure in connection with one embodiment. It should also be understood that the position or arrangement of individual components in each embodiment may be varied without departing from the scope of the present disclosure. Therefore, the following detailed description is not taken to limit the present disclosure, and the scope of the present disclosure is limited only by the appended claims, along with the full scope of equivalents to which such claims are entitled. In the drawings, like reference signs refer to the same or similar functions throughout several aspects.

Hereinafter, preferred embodiments of the present disclosure will be described in more detail with reference to the drawings.

Figure 1:
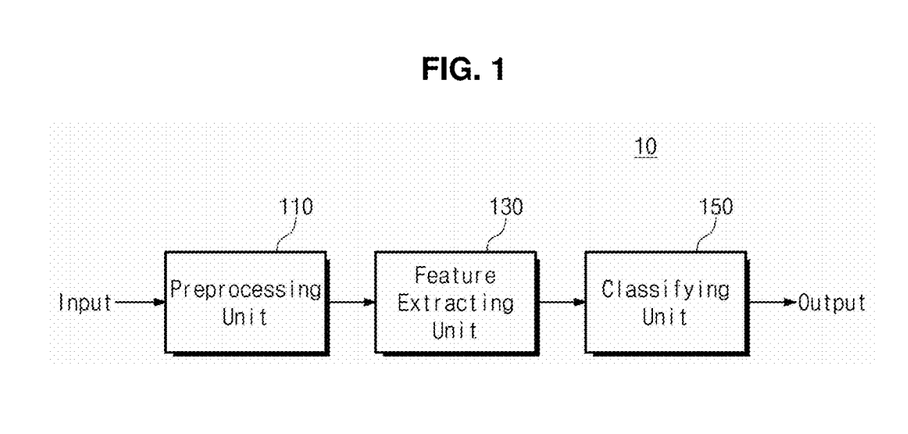
FIG. 1 is a block diagram showing an earthquake event classification device using an attention-based neural network according to an embodiment of the present disclosure.
Figure 2:
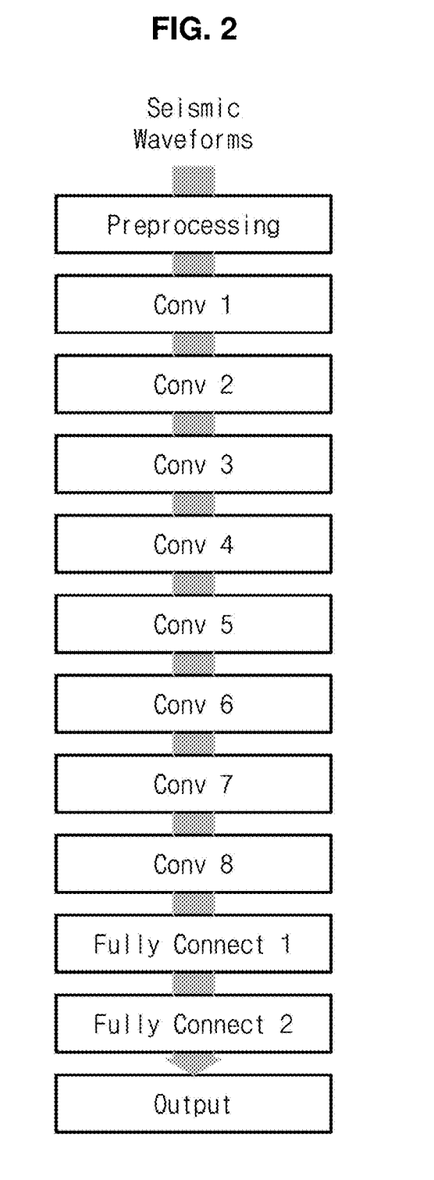
FIG. 2 is a diagram showing a CNN of the earthquake event classification device using an attention-based neural network of FIG. 1.

FIG. 1 is a block diagram showing an earthquake event classification device using an attention-based neural network according to an embodiment of the present disclosure. FIG. 2 is a diagram showing a CNN of the earthquake event classification device using an attention-based neural network of FIG. 1.

An earthquake event classification device 10 (hereinafter, referred to as a device) using an attention-based neural network according to the present disclosure extracts main feature information inherent in data through attention-based deep learning, in order to overcome the limitations of the existing earthquake detection technology.

Referring to FIG. 1, the device 10 according to the present disclosure includes a preprocessing unit 110, a feature extracting unit 130, and a classifying unit 150.

Software (application) for performing earthquake event classification using an attention-based neural network may be installed in and executed by the device 10 of the present disclosure, and the preprocessing unit 110, the feature extracting unit 130 and the classifying unit 150 may be controlled by the software for performing earthquake event classification using an attention-based neural network, which is executed in the device 10.

The device 10 may be a separate terminal or some modules of a terminal. In addition, the preprocessing unit 110, the feature extracting unit 130 and the classifying unit 150 may be formed as an integrated module, or may be made of one or more modules. However, on the contrary, each component may be provided as a separate module.

The device 10 may be mobile or stationary. The device 10 may be in the form of a server or an engine, and may be called using other terms such as a device, an apparatus, a terminal, a user equipment (UE), a mobile station (MS), a wireless device and a handheld device.

The device 10 may execute or manufacture various software based on an operating system (OS), namely a system. The operating system is a system program to enable the software to use hardware of the device, and may include both mobile computer operating systems such as Android OS, iOS, Windows Mobile OS, Bada OS, Symbian OS and BlackBerry OS and computer operating systems such as Window series, Linux series, Unix series, MAC, AIX and HP-UX.

First, a machine learning algorithm related to the present disclosure will be described. In the recognition method using a neural network (NN), a function y=f(x) that derives a result y suitable for a purpose from training data x may be created using the neural network.

At this time, a plurality of variables exist in the function f(x), and a process of finding a plurality of variables through learning data is referred to as a learning process. The basic structure of the neural network is composed of an input layer-a hidden layer-an output layer, and the connection between the layers is a complete connection structure. The process of obtaining the classification result y from new data x by applying a plurality of learned variable values is called a test process.

In the CNN (Convolutional Neural Network), if the dimension of learning data increases (e.g., video input) during the learning process, the amount of parameters to be learned increases exponentially. In order to learn these parameters, a sufficient amount of data is required, but it is substantially impossible to meet the conditions.

Meanwhile, the CNN has an advantage of sufficiently reducing the number of parameters to be learned through convolution operations with the characteristics of local connection and weight sharing. Also, the CNN has an advantage of automatically generating an effective convolution filter through learning. The CNN is composed of three layers: a convolution layer, a pooling layer and a fully-connected (FC) layer.

The convolution layer extracts meaningful features through convolution, and the pooling layer is a process of subsampling to reduce the generated feature values. The fully-connected layer converts the feature value set output from the convolution layer and pooling layer into 1 dimension data and classifies the same using the NN completely connected to the output layer.

The CNN technology has been applied to image classification/detection issues using image or video data. There are two approaches in applying CNN models to time series data such as acoustics. First, there is a method of converting 1 dimension data into 2 dimension data, for example converting 1 dimension sound data into a spectrogram image, and inputting the same to the CNN. The other method is to apply 1 dimension data to 1 dimension convolution, without going through a 2 dimension convolution process.

The present disclosure is a technique for performing earthquake classification or earthquake detection based on an attention-based convolution neural network.

As shown in FIG. 2, the earthquake classification technique using an attention-based convolution neural network according to the present disclosure includes a preprocess step, a feature extraction step (Cony 1 to Cony 8), and a classification step (Fully Connect 1, Fully Connect 2). Each step is processed in the preprocessing unit 110, the feature extracting unit 130 and the classifying unit 150, respectively.

The preprocessing unit 110 performs data preprocessing of Equation 1 below and centering when earthquake data belong to different ranges due to the characteristics of each observation post. In general, the centering process may give an effect of geometrically moving a cluster of data to an origin for all dimensions.

$$y_m = x_m - \frac{1}{M}\sum_{i=1}^{M} x_i, \quad m = 1, \ldots, M \qquad \text{[Equation 1]}$$

Here, xm is observed data, ym is center-shifted data, and M is the number of total samples obtained from one data.

The feature extracting unit 130 includes a plurality of convolutions having three or more layers for extracting a feature map by nonlinearly converting preprocessed earthquake data, measuring importance of a learned feature of the nonlinear-converted earthquake data based on an attention technique in which the interdependence of channels of the feature map is modeled, correcting a feature value of the measured importance value through element-wise multiply with the learned feature map, and performing down-sampling through max-pooling based on the feature value.

Figure 3:
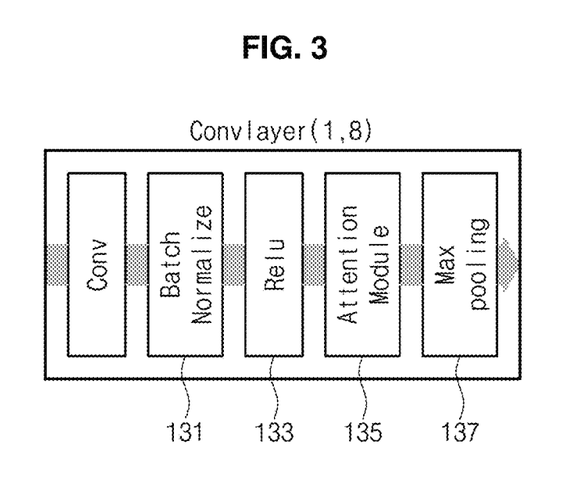
FIG. 3 is a block diagram showing first and eighth convolution layers in the earthquake event classification device using an attention-based neural network of FIG. 1.
Figure 4:
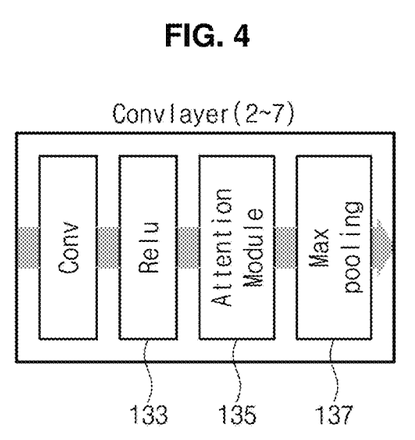
FIG. 4 is a block diagram showing second to seventh convolution layers in the earthquake event classification device using an attention-based neural network of FIG. 1.
Figure 5:
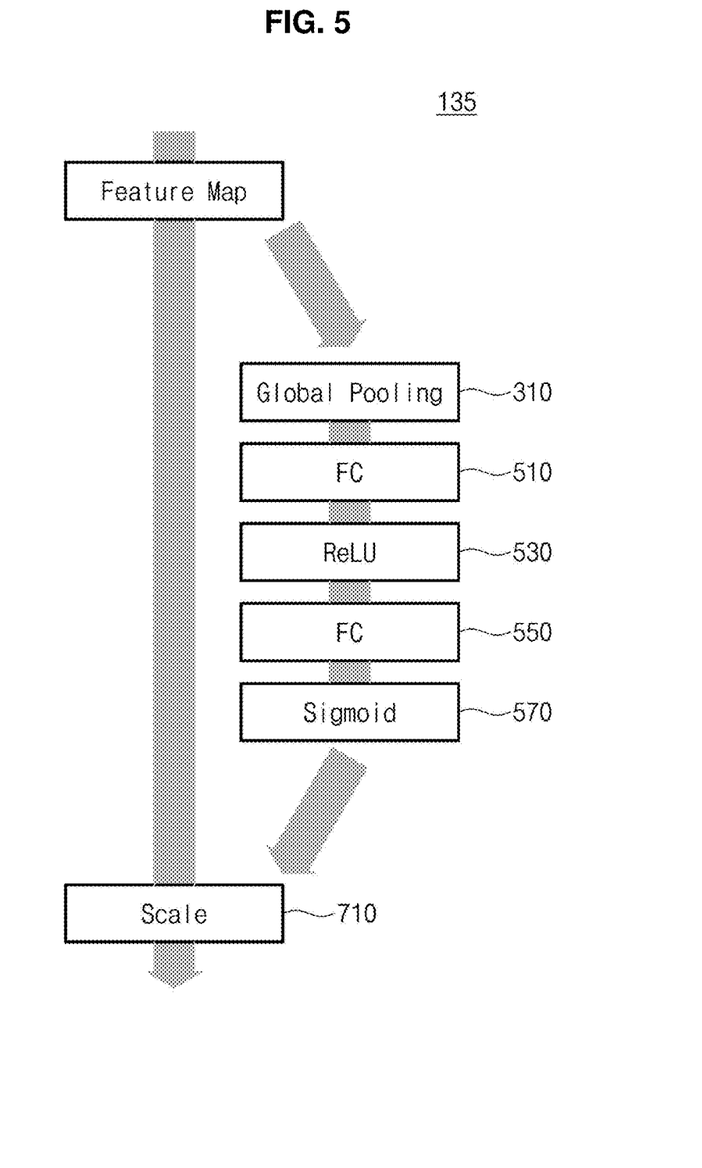
FIG. 5 is a block diagram showing an attention module of the earthquake event classification device using an attention-based neural network of FIG. 1.

The attention-based CNN structure proposed in the present disclosure is as shown in FIGS. 2 to 4. FIG. 3 is a block diagram showing first and eighth convolution layers in the earthquake event classification device using an attention-based neural network of FIG. 1. FIG. 4 is a block diagram showing second to seventh convolution layers in the earthquake event classification device using an attention-based neural network of FIG. 1. FIG. 5 is a block diagram showing an attention module of the earthquake event classification device using an attention-based neural network of FIG. 1.

Referring to FIG. 3, the model is input using 3 channel earthquake data, and input data of 1000 samples per channel is used. 1000 sample input data represents data of 10 sec interval of 100 Hz sampling. The proposed model is composed of 8 convolution layers, 2 fully-connected (FC) layers and a softmax function.

In eight convolution layers, as shown in Equation 2 below, 1D convolution is performed, and the convolution results are subjected to nonlinear mapping through a ReLU (Rectified Linear Unit) function as in Equation 3. The filter size of 1D convolution uses 3×1 type, and 32 may be applied as a channel size for each layer.

$$F^l_{c,t} = R\left(\sum_{c'}^{C}\sum_{t'}^{3} F^{l-1}_{c',t-t'-1} \cdot W^l_{c,c',t'}\right) \text{ for } l = 1, \ldots, 8 \quad \text{[Equation 2]}$$

Here, $F^1_{c,t}$ represents the feature map in the first layer, and c and t represent the channel and sample time, respectively. Also, $W_l$ represents a convolution filter in the first layer.

$$R(z) = \max(0, z) \quad \text{[Equation 3]}$$

Referring to FIGS. 3 and 4, each convolution layer of the feature extracting unit includes a nonlinear converting module 133 for nonlinear converting the preprocessed earthquake data, an attention module 135, and a max-pooling module 137 for performing down-sampling through max-pooling based on the feature value.

The attention module 135 outputs the feature value of the nonlinear-converted earthquake data by measuring the importance of the learned feature based on the attention technique in which the interdependence between the channels of the feature map is modeled.

The first convolution layers and the eighth convolution layer, which are a first layer and a last layer, further include a batch normalization module 131 before the nonlinear converting module 133 as shown in FIG. 3.

For the nonlinear mapping result, the nonlinear converting module 133 measures the importance of the learned feature based on the attention technique shown in FIG. 5. The measured importance calculates an improved feature value through element-wise multiply with the learned feature.

The calculated feature value is subjected to a down-sampling process through max-pooling. The interval of max-pooling is set to, for example, 2, so that the feature information is reduced to ½ whenever this process is performed.

The attention module 135 is a means for extracting major components from the feature and improving the feature. In the present disclosure, as shown in FIG. 5, an improved attention module based on SENET (Squeeze and Excitation Network) is proposed.

The SENET models the interdependence between channels of the feature map to improve the expression ability of the network. The SENET includes a squeeze operation unit 310, excitation operation units 510 to 570, and a scaling unit 710 for correcting the feature value through element-wise multiply with the learned feature map.

The squeeze operation unit 310 compresses the feature map while maintaining global information using global average pooling in each channel. The excitation operation units 510 to 570 are used by two fully-connected (FC) layers 510, 550 and a sigmoid activation function 570 to recalibrate the attention value adaptively according to the importance of each channel.

The first fully-connected layer 510 represents a dimension reduction layer having a reduction ratio r, and may further include a ReLU (Rectified Linear Unit, 530). The second fully-connected layer 550 represents a dimension restoration layer that restores to the channel dimension of the feature map.

In the final attention value, the importance of the channel is adjusted to a value between 0 and 1 through the sigmoid activation function 570. In the existing SENET, squeeze operation is performed using global average pooling as shown in Equation 4 below.

In the present disclosure, as in Equation 5 below, a global weighted average pooling method using a contrast stretching process used for image enhancement is adopted. Contrast stretching is a method of improving the visibility of an image by diffusing a histogram of a low contrast image distribution to achieve a wide range of contrast values. If this concept is applied to the feature map, it is possible to include more distinct statistical information for each channel.

$$s_{GAP}(c) = \frac{1}{L}\sum_{i=1}^{L} F_c(i) \quad \text{[Equation 4]}$$

$$s_{GWAP}(c) = \frac{1}{L}\sum_{i=1}^{L} \beta_c(i) G_{max_c} \quad \text{[Equation 5]}$$

Here, $F_c(i)$ represents a feature map of a channel c, and each channel has a length of L. Also, $$\beta_c(i) = \frac{F_c(i) - G_{min_c}}{G_{max_c} - G_{min_c}},$$

and $G_{max_c}$ and $G_{min_c}$ represent a maximum value and a minimum value of the channel c in the feature map.

Hereinafter, the batch normalization module 131 included in the first and last convolution layers will be described.

As the layer of the network (Network) increases, the problems of gradient vanishing and exploding are main issues of the deep network. Various attempts have been made to solve these problems through changes in the activation function, initialization, and learning rate.

Batch normalization takes an approach to solve the problem of gradient vanishing and gradient exploding within the essential training process. Batch normalization is designed by devising a whitening method that normalizes the input distribution of each layer to have an average of 0 and a standard deviation of 1 in order to prevent an internal covariance shift phenomenon in which the input distribution is different for each layer.

After obtaining the average and dispersion for each feature, the normalization is performed, and a conversion process for adding a scale factor and a shift factor to the normalized values is performed. The parameters of the scale factor and the shift factor may be derived in the training process in a mini-batch unit.

In the present disclosure, drop-out regularization is applied to the first fully-connected (FC) layer in order to prevent overfitting of the classifying unit 150.

Drop-out activates each neuron according to a probability value and applies the neuron to learning. In the present disclosure, in the first fully-connected layer, the network may be trained by setting as p=0.5.

The present disclosure strongly extends the existing CNN-based deep learning technique against noise and overfitting through the attention module, the batch normalization module and the drop-out regularization module.

The present disclosure may be used for effective earthquake warning of the national comprehensive earthquake information system. Specifically, by building an earthquake detection system robust to a situation where noise, artificial earthquakes, and the like are mixed, it is possible to apply accurate and low-error earthquake detection information to provide accurate alarms and responses and contribute to the protection and safety of people's lives. In addition, it is possible to appropriately respond according to earthquake characteristics and situations by classifying the earthquake information from artificial earthquakes and reduce the possibility of false alarms.

In addition, the present disclosure may be utilized to obtain detailed earthquake data information. If an earthquake detector developed through the present disclosure is applied to an earthquake observation system, it is possible to collect high-precision earthquake data with less probability of false detection caused by noise and artificial earthquake. This data may be provided as data applicable to earthquake observation and other earthquake studies.

Figure 6:
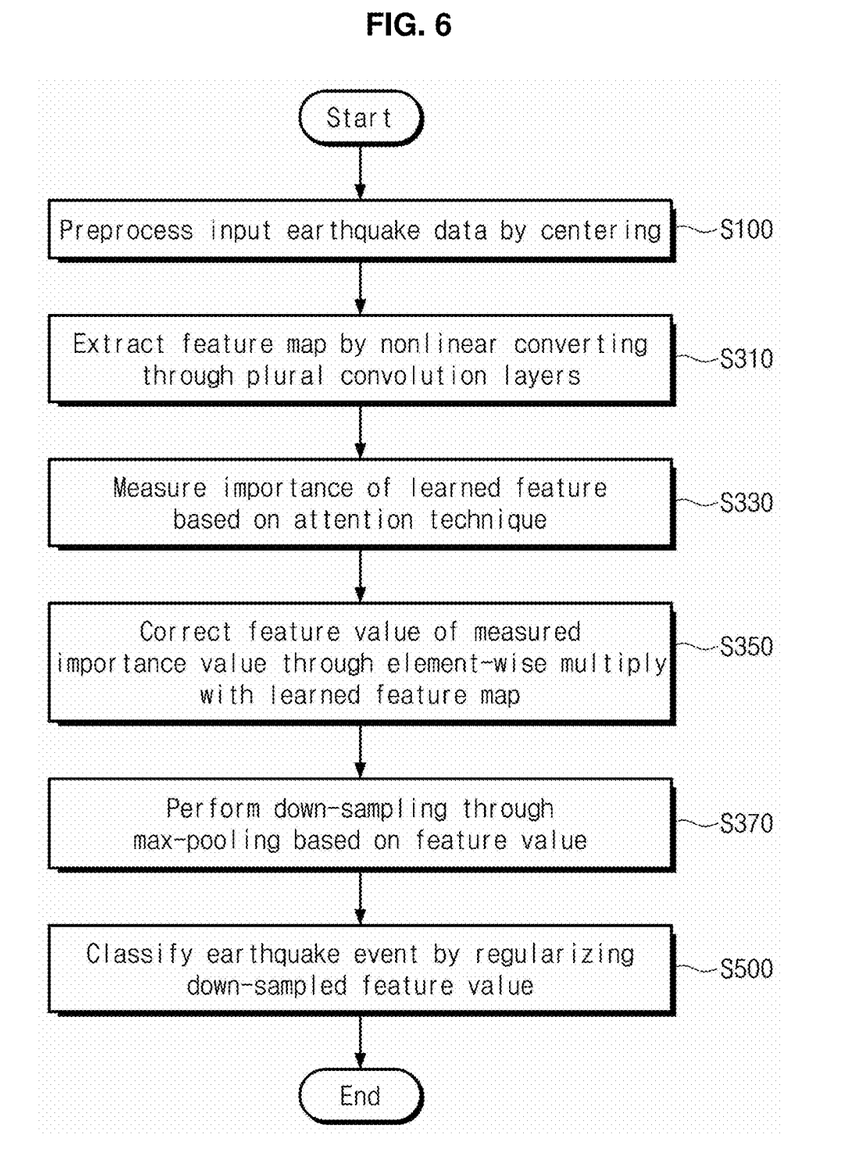
FIG. 6 is a flowchart for illustrating an earthquake event classification method using an attention-based neural network according to an embodiment of the present disclosure.

FIG. 6 is a flowchart for illustrating an earthquake event classification method using an attention-based neural network according to an embodiment of the present disclosure.

The earthquake event classification method using an attention-based neural network according to this embodiment may be performed in substantially the same configuration as the device 10 of FIG. 1. Therefore, the same components as the device 10 of FIG. 1 are designated by the same reference numerals, and repeated descriptions are omitted.

In addition, the earthquake event classification method using an attention-based neural network according to this embodiment may be executed by software (application) for performing an earthquake event classification using the attention-based neural network.

Referring to FIG. 6, the earthquake event classification method using an attention-based neural network according to this embodiment preprocesses input earthquake data by centering (step S100).

In the step S100, the data preprocessing using Equation 1 and centering is performed when earthquake data belong to different ranges due to the characteristics of each observation post. In general, the centering process may obtain the effect of geometrically moving a cluster of data to an origin for all dimensions.

Subsequently, as a feature extracting step, the feature map is extracted by nonlinearly converting the preprocessed earthquake data through a plurality of convolution layers having three or more layers (step S310).

For example, this step may be performed through 8 convolution layers. Each convolution layer performs 1D convolution as in Equation 2, and the convolution result is subject to nonlinear mapping through a ReLU (Rectified Linear Unit) function such as Equation 3. The filter size of 1D convolution uses 3×1 type, and 32 may be applied as a channel size in each layer.

The importance of the learned feature is measured based on the attention technique in which the interdependence between the channels of the feature map is modeled, for the nonlinear-converted earthquake data (step S330).

In the step S330, a squeeze operation for compressing the feature map while maintaining global information in each channel and an excitation operation for recalibrating the importance value adaptively according to the importance of each channel using two fully-connected (FC) layers and a sigmoid activation function are performed.

The squeeze operation uses a global weight average pooling method that diffuses a histogram of a low-contrast image distribution based on contrast stretching.

The excitation operation may go through a step of passing the compressed feature map through a dimension reduction layer having a predetermined reduction ratio and a step of restoring the data passing through the dimension reduction layer to the channel dimension of the feature map.

The step of nonlinearly mapping the input data of the preprocessed earthquake data by passing through a plurality of convolution layers having three or more layers may further include a step of batch-normalizing the feature value of the preprocessed earthquake data in the first convolution layer and the last convolution layer among the plurality of convolution layers.

At this time, an average and dispersion of each feature value are obtained, and then the regularized feature values are transformed while adding a scale factor and a shift factor thereto.

The feature value of the measured importance value is corrected through element-wise multiply with the learned feature map (step S350), and down-sampling is performed through max-pooling based on the feature value (step S370). For example, the interval of the max-pooling may be set to, for example, 2, so that the feature information is reduced to ½ whenever this process is performed.

The earthquake event is classified by regularizing the down-sampled feature value (step S500).

In the step S500, drop-out regularization may be applied to the first fully-connected (FC) layer in order to prevent overfitting.

Drop-out activates each neuron according to a probability value and applies the neuron to learning. In the present disclosure, the network may be trained by setting as p=0.5 in the first fully-connected layer.

Hereinafter, experimental results for verifying the effect of the present disclosure will be described. For the experiment, earthquake data and noise data were collected using earthquake data information generated in Korea from Jan. 1, 2016 to Jul. 31, 2018. The earthquake event and noise database were constructed based on the 24-hour earthquake observation data and earthquake event list files provided by the Korea Meteorological Administration.

As for the earthquake data, only 100 sample data were used, and the database was composed of strong earthquake (more than magnitude 2.0), micro earthquake (less than magnitude 2.0), artificial earthquake, and noise. Data from 2016 to 2017 was used as a learning data set, and data from 2018 was used as a test data set.

In order to extract the earthquake event, data for 10 seconds was extracted from the time when the earthquake was observed at each observation post. However, in order to increase the amount of collected data, in the present disclosure, data for a total of 13 seconds was extracted from 3 seconds before the time when the earthquake occurs, and a method of sliding the extraction window every 1 second was applied.

The noise event was collected in two ways. In case of the date recorded in the earthquake event list, noise data was extracted by random sampling from the part except for 1 hour before and after the occurrence time, and in case of the date not recorded in the earthquake event list, noise data was randomly extracted within 24 hours data. Table 1 shows the event data set used in the simulation.

TABLE 1

| event | (1) (learning/test) | (2) (learning/test) | (3) (learning/test) |
|---|---|---|---|
| earthquake (1) vs noise (2) | 21,340/3,248 | 22,523/5,752 | |
| strong earthquake (1) vs noise (2) | 10,772/688 | 22,523/2,312 | |
| micro (1) vs noise (2) | 8,328/1,932 | 22,523/4,068 | |
| artificial (1) vs noise (2) | 2,240/628 | 22,523/2,372 | |
| natural (1) vs artificial (2) vs noise (3) | 19,100/2,620 | 2,240/628 | 22,523/5,752 |

This simulation was performed based on NVIDIA Geforce GTX 1080Ti GPU and Tensorflow, and the network training was performed in a total of 300 epochs. The ADAM method was used for optimization in model training, and the learning rate was $5 \times 10^{-3}$. For the performance analysis of the technique of the present disclosure, comparative analysis with ConvNetQuake was performed, and the performance was measured using accuracy, true positive rate and false positive rate indices as in Equations 6 to 8.

$$Accuracy = \frac{TP + TN}{\text{Number of tests}} \quad \text{[Equation 6]}$$

$$TPR = \frac{TP}{TP + FN} \quad \text{[Equation 7]}$$

$$FPR = \frac{FP}{TN + FP} \quad \text{[Equation 8]}$$

Here, TP represents the number of true positives, TN represents the number of true negatives, and FP represents the number of false positives.

Table 2 below compares the performance of the method proposed in the present disclosure (unit %).

TABLE 2

| | ConvNetQuake | | | Proposed method 1 (using GAP) | | | Proposed method 2 (using GWAP) | | |
|---|---|---|---|---|---|---|---|---|---|
| | Acc | TPR | FPR | Acc | TPR | FPR | Acc | TPR | FPR |
| earthquake vs noise | 93.2 | 89.2 | 4.5 | 97.0 | 95.0 | 1.8 | 97.6 | 95.7 | 1.3 |
| strong earthquake vs noise | 95.8 | 89 | 2.1 | 98.2 | 96.4 | 1.3 | 98.8 | 97.4 | 0.8 |
| micro vs noise | 93.9 | 84.5 | 1.6 | 98.2 | 95.7 | 0.6 | 98.2 | 96.3 | 0.9 |
| artificial vs noise | 93.7 | 74.5 | 1.2 | 96.1 | 83.0 | 0.4 | 96.7 | 84.9 | 0.2 |
| natural vs artificial vs noise | 89.1 | 84.6/ 45.2/ 95.9 | 6.5/ 1.2/ 14.2 | 95.3 | 93.5/ 72.9/ 98.5 | 2.6/ 1.1/ 5.2 | 95.6 | 94.6/ 74.2/ 98.5 | 2.7/ 1.0/ 4.2 |

In the experiment of Table 2, the baseline structure was compared with the existing ConvNetQuake. The proposed methods in Table 2 show better performance than the baseline method for all event classification.

The proposed method 2 improves the accuracy by 4.24% on average compared to the existing baseline. In addition, in the case of binary classification, the improvement of TPR is remarkable, and in case of multiple classification, the improvement of TPR and the reduction of FPR are shown. In case of artificial earthquake events, the performance is not so excellent compared to other event classifications, and it is presumed that the data quantity and data length are insufficient.

In addition, in case of the attention module according to squeeze operation, the proposed method using GWAP shows better performance in all event classifications than the existing method using GAP, and improvement of accuracy by 0.42% on average is shown.

The earthquake event classification method using an attention-based neural network as described above may be implemented in the form of an application or program commands executable by various computer components and be recorded on a computer-readable recording medium. The computer-readable recording medium may include program commands, data files, data structures or the like solely or in combination.

The program commands recorded on the computer-readable recording medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like.

The program commands include not only machine codes made by a complier but also high-level language codes executable by a computer by using an interpreter. The hardware device may be configured to operate as at least one software module to perform the operations of the present disclosure, or vice versa.

While the present disclosure has been described with reference to the embodiments, it will be understood by those skilled in the art that various changes and modifications can be made without departing from the scope of the present disclosure as set forth in the appended claims.

INDUSTRIAL APPLICABILITY

The present disclosure may be utilized in the disaster prevention IT market. Disasters related to earthquakes tend to increase worldwide. South Korea is also attracting a lot of interest and investment in the disaster prevention system while experiencing the earthquakes in Gyeongju and Pohang.

In addition, the present disclosure is expected to be a technology that can be widely used by nations (a weather center in each country) or allied organizations rather than companies that generate profits using a disaster prevention-related technology.

The invention claimed is:

1. An earthquake event classification method using an attention-based neural network, the method comprising:
preprocessing input earthquake data by centering;
extracting a feature map by nonlinearly converting the preprocessed earthquake data through a plurality of convolution layers having three or more layers;
measuring an importance value of a learned feature of the nonlinear-converted earthquake data based on an attention technique in which interdependence between channels of the feature map is modeled;
correcting a feature value of the measured importance value through element-wise multiply with the learned feature map;
performing down-sampling through max-pooling based on the corrected feature value; and
classifying an earthquake event by regularizing the down-sampled feature value.

2. The earthquake event classification method using an attention-based neural network according to claim 1,
wherein said measuring of the importance value of the learned feature includes:
performing a squeeze operation to compress the feature map while maintaining global information at each channel.

3. The earthquake event classification method using an attention-based neural network according to claim 2,
wherein said performing of the squeeze operation uses a global weight average pooling method that diffuses a histogram with a low contrast image distribution based on contrast stretching.

4. The earthquake event classification method using an attention-based neural network according to claim 2,
wherein said measuring of the importance value of the learned feature further includes:
performing an excitation operation to adaptively recalibrate the importance value according to importance of each channel using two fully-connected (FC) layers and a sigmoid activation function.

5. The earthquake event classification method using an attention-based neural network according to claim 4,
wherein said performing of the excitation operation includes:
passing the compressed feature map through a dimension reduction layer having a predetermined reduction ratio; and
restoring the data passing through the dimension reduction layer to a channel dimension of the feature map.

6. The earthquake event classification method using an attention-based neural network according to claim 1,
wherein said performing of a nonlinear mapping by passing input data of the preprocessed earthquake data through the plurality of convolution layers having three or more layers further includes:
batch-normalizing the feature value of the preprocessed earthquake data in a first convolution layer and a last convolution layer among the plurality of convolution layers.

7. The earthquake event classification method using an attention-based neural network according to claim 6,
wherein said batch-normalizing of the feature value obtains an average and dispersion of each feature value and then converts regularized feature values while adding a scale factor and a shift factor thereto.

8. The earthquake event classification method using an attention-based neural network according to claim 1,
wherein said classifying of the earthquake event by regularizing the down-sampled feature value passes through first and second fully-connected (FC) layers, and the first fully-connected layer performs a drop-out regularization process in which each neuron is activated according to a probability value and applied to learning.

9. A non-transitory computer-readable recording medium, in which a computer program for executing the earthquake event classification method using an attention-based neural network according to claim 1 is recorded.

10. An earthquake event classification device using an attention-based neural network, comprising:
one or more processors configured to execute instructions stored in a memory, thereby configuring the one or more processors to:
preprocess input earthquake data by centering;
control a plurality of convolution layers having three or more layers to:
extract a feature map by nonlinearly converting the preprocessed earthquake data,
measure an importance value of a learned feature of the nonlinear-converted earthquake data based on an attention technique in which interdependence between channels of the feature map is modeled,
correct a feature value of the measured importance value through element-wise multiply with the learned feature map, and
perform down-sampling through max-pooling based on the corrected feature value; and
control first and second fully-connected (FC) layers to classify an earthquake event by regularizing the down-sampled feature value.

11. The earthquake event classification device using an attention-based neural network according to claim 10,
wherein each convolution layer is configured to:
nonlinearly convert the preprocessed earthquake data;
output a feature value of the nonlinear-converted earthquake data by measuring the importance value of the learned feature based on the attention technique in which interdependence between channels of the feature map is modeled; and
perform down-sampling through max-pooling based on the feature value.

12. The earthquake event classification device using an attention-based neural network according to claim 11,
wherein each convolution layer is further configured to:
compress the feature map of the nonlinear-converted earthquake data while maintaining global information at each channel;

adaptively recalibrate the importance value according to importance of each channel by using two fully-connected (FC) layers and a sigmoid activation function; and correct the feature value of the measured importance value through element-wise multiply with the learned feature map.

13. The earthquake event classification device using an attention-based neural network according to claim 12,
wherein each convolution layer is further configured to:
pass the compressed feature map through a dimension reduction layer having a predetermined reduction ratio; and
restore the data passing through the dimension reduction layer to a channel dimension of the feature map.

14. The earthquake event classification device using an attention-based neural network according to claim 10,
wherein a first convolution layer and a last convolution layer are configured to obtain an average and dispersion of each feature value and then convert the regularized feature values while adding a scale factor and a shift factor thereto.

15. The earthquake event classification device using an attention-based neural network according to claim 10,
wherein a first fully-connected layer is configured to perform a drop-out regularization process in which each neuron is activated according to a probability value and applied to learning.

* * * * *